United States Patent [19]

Adachi et al.

[11] 4,014,976

[45] Mar. 29, 1977

[54] PROCESS FOR PRODUCTION OF TITANIUM TETRACHLORIDE

[75] Inventors: Masaaki Adachi, Ohtsu; Takayoshi Shirai, Yokkaichi; Norio Nakasuzi, Kusatsu, all of Japan

[73] Assignee: Ishihara Sangyo Kaisha Ltd., Osaka, Japan

[22] Filed: Mar. 24, 1976

[21] Appl. No.: 670,074

[30] Foreign Application Priority Data

Mar. 28, 1975 Japan .............................. 50-38260

[52] U.S. Cl. .............................. 423/79; 423/74; 423/492

[51] Int. Cl.² .................................... C01G 23/02

[58] Field of Search ...................... 423/74, 492, 79

[56] References Cited

UNITED STATES PATENTS

| 2,320,273 | 5/1943 | Gohr et al. | 423/659 F UX |
|---|---|---|---|
| 2,488,029 | 11/1949 | Scheineman | 423/659 F UX |
| 2,683,685 | 7/1954 | Matheson | 423/659 UX |
| 2,786,280 | 3/1957 | Gishler et al. | 423/659 F UX |
| 2,940,826 | 6/1960 | Anderson | 423/74 |
| 3,488,143 | 1/1970 | Wendell et al. | 423/79 |
| 3,495,936 | 2/1970 | Jones, Jr. | 423/79 |

FOREIGN PATENTS OR APPLICATIONS 163,317  6/1955  Australia .......................... 423/659

Primary Examiner—Edward Stern
Attorney, Agent, or Firm—Cushman, Darby & Cushman

[57] ABSTRACT

Titanium tetrachloride is produced by reacting a titaniferous material having a particle size of 150 mesh or less (Tyler standard) as a median value with a chlorine-containing gas in the presence of a coarse carbonaceous substance in a dilute-phase fluidization system.

12 Claims, 1 Drawing Figure

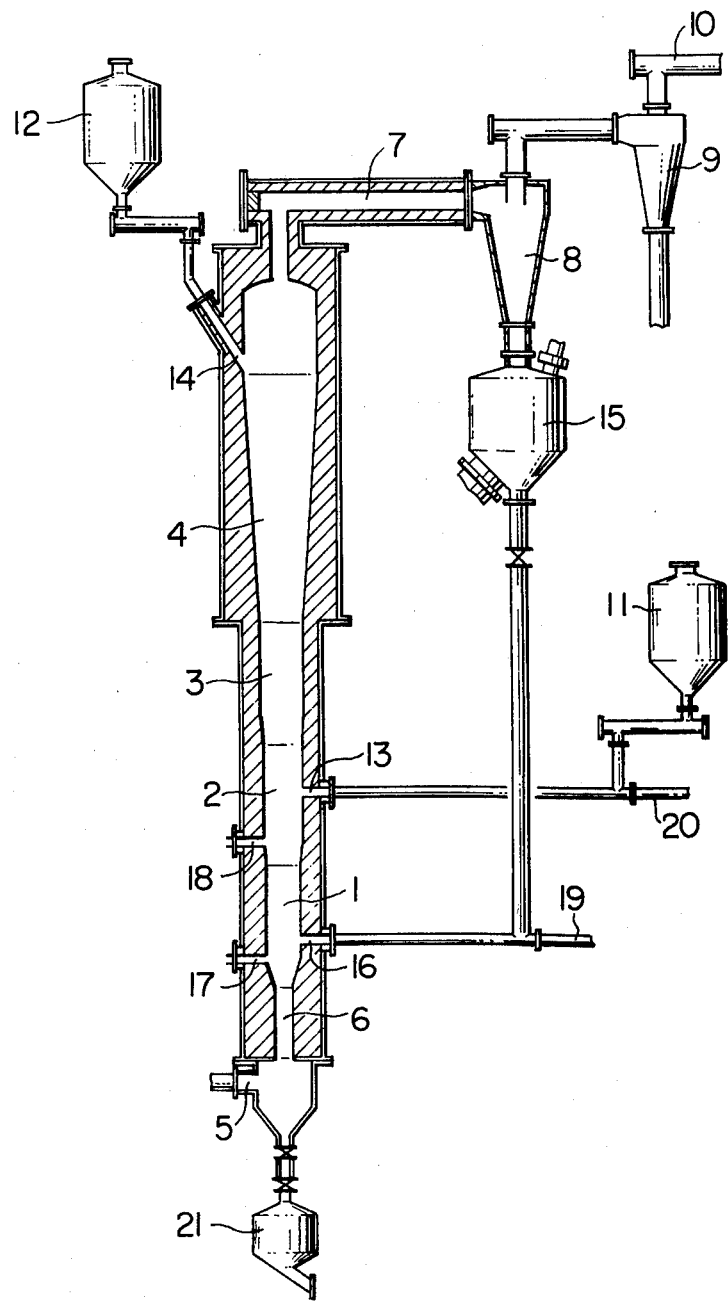

PROCESS FOR PRODUCTION OF TITANIUM TETRACHLORIDE

The present invention relates to a process for production of titanium tetrachloride. More particularly, the invention pertains to an improved process for production of titanium tetrachloride by the chlorination of titaniferous materials in a dilute-phase fluidization system.

Most production of titanium tetrachloride on a commercial scale has heretofore been carried out by a dense-phase fluidization-chlorination process. In this process, a dense-phase fluidized bed of a solid concentration of 300 to 2,000 kg/m$^3$ is formed at a superficial linear velocity of the gas of 0.05 to 1.0 m/sec. in a column. Under these conditions, it is substantially impossible to use solid raw materials containing such fine powder as passes through a 200 mesh Tyler standard sieve. Also, titaniferous materials, which contain a large amount of impurities and are easy to sinter, such as, for example, titanium slag cannot be used since the use of such titaniferous materials causes plugging of gas distributor and sintering of the particles.

On the other hand, it is known to effect the chlorination of a titaniferous material in a dilutephase fluidization system of a solid concentration of 10 to 100 kg/m$^3$ at a superficial linear velocity of the gas of 1 to 10 m/sec. in a column. In this case, comparatively fine titaniferous materials or the materials containing a large amount of impurities can also be used. However, this process has disadvantages in that the solid concentration in the reaction zone is low as compared with a dense-phase fluidization system chlorination, it is difficult to increase the conversions of the solid phase and the gas phase simultaneously since the solid and gas phases are sent in parallel flow; and the heat balance is remarkably unfavorable, and thereby the process has not been put to practical use. An improved process for production of titanium tetrachloride in a dilute-phase fluidization system is proposed in U.S. Pat. No. 3,495,936 which comprises using a comparatively coarse titaniferous material 80% by weight of which may be from 60 to 200 mesh (Tyler standard) and maintaining the solid concentration at 4 to 8 lbs./cu. ft. (64 to 128 kg/m$^3$). Even by this improved process, the improvement of the disadvantageous heat balance is not satisfactory, and a defect that finer titaniferous materials than the above-mentioned range are difficult to use still remains.

It is, therefore, an object of the present invention to provide an improved process for production of titanium tetrachloride which can give a high reaction efficiency and a good heat balance.

Another object of the present invention is to provide a process for production of titanium tetrachloride wherein fine titaniferous materials which are not suitable for no only prior art dense-phase fluidization chlorination but also the dilute-phase fluidization chlorination according to the above-mentioned U.S. Pat. No. 3,495,936 can be used as a raw material.

Other objects and a fuller understanding of the invention may be apparent from the following description and claims, taken in conjunction with the accompanying drawing which outlines a multi-stage column-type reactor which may be used in the process of the present invention.

According to the present invention, there is provided an improved process for continuous production of titanium tetrachloride by chlorinating a titaniferous material in a dilute-phase fluidization system, which comprises (1) feeding (a) a fine particulate titaniferous material having a particle size of 400 to 150 mesh (Tyler standard) as a mean value, (b) a coarse particulate solid carbonaceous substance having a particle size as a median value of at least three times as large as that of the titaniferous material and (c) a chlorine-containing gas to a reactor, the reactor having (d) a substantially vertical and long solid suspension zone of a ratio of height to lower part diameter of at least 10 in which (e) a ratio of upper part sectional area to lower part sectional area is from 1.2 to 10 so that the velocity of the upwardly flowing gas may not increase as the gas ascends, (2) controlling the amounts of said reactants fed so that (f) the maximum value of the superficial linear velocity of the gas may be from 1 to 10 m/sec., (g) the solid concentration may be from 10 to 200 kg/m$^3$, and (h) a ratio of the solid carbonaceous substance in solids may be from 70 to 99% by weight, (3) repeating pneumatic transport and reflux of most of the solid carbonaceous substance in the upward flow of the gas to form a dilute-phase suspension in which the titaniferous material is chlorinated at a temperature of 900° to 1400° C while it ascends being entrained by the gas flow, and (4) removing the reaction product gas from the upper part of the reactor and separating the reaction product gas into a chloride gas containing titanium tetrachloride and the unreacted solid substances.

The titaniferous materials which may be used in the process of the present invention include titaniferous ores such as rutile and ilmenite, titanium concentrates such as titanium slag obtained by metallurgical treatment of the ores, beneficiated ores obtained by acid leaching treatment of the ores, and titanium residue recovered from the step of production of titanium dioxide pigments. Titaniferous materials which have not been usable in prior art fluidization-chlorination processed owing to their high content of impurities or their very fine particle size may also be used in the process of the present invention. The particle size should be from 400 to 150 mesh (Tyler standard, about 37 to 104 $\mu$) as a median value. The medium value means the size of the opening of the standard sieve on which 50% by weight of a sample remains and is indicated by the number of Tyler standard sieve. Therefore, massive raw materials such as titanium slag are usually pulverized so that 50% by weight or more, and preferably 80% by weight or more, thereof may pass through a 150 mesh standard sieve. Fine titaniferous materials at least 20% by weight or 100% by weight of which pass through a 200 mesh standard sieve can be used as such. If the particles are too fine to transport or feed them to a reactor smoothly, it is preferably to convert them into such granules as readily disintegrated and are dispersed in the reactor. Titanium slag and acid-leaching concentrates of titaniferous ores which have been difficult to use in prior art fluidization-chlorination processes owing to their too fine particle size or their too high content of imparities are used rather preferably as a raw material in the process of the present invention because of their high reactivity.

The solid carbonaceous substances which may be used as a reducing agent and as a material forming a kind of bed in the process of the present invention include coarse particulate coke, anthracite and charcoal, and preferably have a low ash content like, for example, coke. As for the particle size of the carbonaceous substance fed freshly to the reaction system, the median value should be at least three times, and preferably five times, as large as that of the titaniferous material, and in general, are preferably from 60 to 14 mesh (from 246 to 1168 $\mu$). In fact, the particle size of the carbonaceous substance is prepared so that 80% by weight of the whole may be from 10 to 100 mesh and preferably from 14 to 60 mesh.

As the chlorine-containing gas, chlorine or the gas recovered from the step of oxidizing titanium tetrachloride is usually used, but an inert gas, oxygen or fresh chlorine gas may be added thereto if necessary.

The reactor used in the process of the present invention is generally called by "a dilute-phase fluidization reactor" and is a substantially vertical and long column of such a type as the solid particles are reacted in a dilute-phase fluidization system. In prior art dense-phase fluidization for chlorination, the solid suspension zone has a ratio of height to diameter of about 0.4 to 4. On the other hand, in the column reactor used in the process of the present invention, a ratio of height to diameter of lower part in the solid suspension zone is 10 or more, and usually from 100 to 300 on a laboratory scale and from 10 to 50 on a commercial scale. The amount of the gas increases as the gas flow ascends with the progress of reaction in the solid suspension zone. Therefore, the whole solid suspension zone must be of an upwardly widening form so that the superficial linear velocity of the gas at its upper part may not be larger than that at its lower part nevertheless. A ratio of upper part sectional area to lower part sectional area in this zone should be from 1.2 to 10, and preferably from 1.4 to 6. As a whole, the reactor is of an upwardly non-stepwise widening pen-holder-form column type or of an upwardly stepwise widening multi-stage rocket-form column type. The term "solid suspension zone" used herein means a zone in which a solid suspension consisting mainly of a coarse particulate carbonaceous substance is formed, and substantially all of the reaction is carried out in the zone.

The titaniferous material, the solid carbonaceous substance and the chlorine-containing gas each are fed to a reactor separately or at least two thereof are fed at the same feed inlet. As for amount of the gas fed, the maximum value of the superficial linear velocity of the gas in the solid suspension zone of the column, that is, the velocity at the lower part of the solid suspension zone should be from 1 to 10 m/sec., and preferably from 1 to 5 m/sec., and should be regulated so that the velocity may be close to the terminal velocity of particles of the coarse part of the solid carbonaceous substance. The amount of the titaniferous material and the solid carbonaceous substance for make-up should be regulated so that the average concentration of the solids in the solid suspension zone may be from 10 to 200 kg/m$^3$, and preferably from 20 to 100 kg/m$^3$ and a ratio of the solid carbonaceous substance in the solids in the solid suspension zone may be from 70 to 99% by weight, and preferably from 80 to 95% by weight. If the height of the solid suspension zone is such a height as the residence time of the gas is from 2 to 20 sec., and preferably from 5 to 15 sec., and the carryover amount of the solids due to a reduction in the flow rate of the gas in the neighborhood of the exit for the reaction product gas caused by the upward widening of the reactor is regulated to 5 to 70% by weight of the amount fed, and preferably 10 to 50% by weight, the conversion of the chlorine gas can easily reach 100%.

In some cases, the materials fed are suitably preheated by external heating or heat is supplemented by supplying oxygen gas to the reaction zone, but the inside of the reactor is kept at the reaction temperature by returning the heat of reaction to the reactants as far as possible. The reaction temperature is suitably from 900° to 1200° C when the titaniferous material is titanium slag and from 1000° to 1300° C when the titaniferous material is other than titanium slag. Since the reaction zone is long in the process of the present invention, the heat of reaction is not utilized satisfactorily but part of the solid suspension zone often becomes a dead space if all the reactants are fed to the reactor at its lowermost end only. Therefore, it is often advantageous to introduce part of the reactants to the reactor at any suitable place or places above the lowermost end. Also, part or all of the solid carbonaceous substance may be fed to the reactor at its upper end to return the heat of the exit gas to the reaction zone and improve the heat balance, or the reflux of the solid in the reaction zone may be carried out vigorously to unify the heat in the reaction zone. A combination of the top feed of the make-up solids and the recycle of the carry-over solids is advantageous from the viewpoint of heat balance.

The gas exhausted from the reactor consists of chlorides such as titanium tetrachloride and iron chloride, gaseous components such as oxygen, nitrogen, carbon dioxide, carbon monoxide and a very small amount of any unreacted chlorine, if any, and further the unreacted titaniferous material and the unreacted solid carbonaceous substance. The exit gas is separated into the gaseous components and the solid components by, for example, a cyclone, and the gaseous components are condensed and purified to obtain titanium tetrachloride. The separated unreacted solid components are usually recycled to the reaction zone while hot.

The process of the present invention is characterized in that the solid concentration in the solid suspension zone is within a transition zone and is higher than usual values in simple pneumatic transport and lower than usual values in dense-phase fluidization, and that a comparatively stabilized fluidized state can be maintained without causing slugging or channeling. This fact is presumed to be based on the fact that an upwardly widening column is used as the reactor, the linear velocity of the gas is upwardly and successively reduced, and as a result a peculiar dilute-phase fluidized suspension is formed in which the carbonaceous substance is suspended over almost all the inside of the reactor by repeating pneumatic transport and reflux. It has been substantiated that the suspension of the carbonaceous substance thus formed maintains the heat of reaction, decreases the amount of the heat removed by the reaction product gas, and makes a great contribute to uniformity of the heat in the reaction zone. Further, the suspension of the conbonaceous substance has an interrupting effect for entrainment of the titaniferous material by the upward flow of the gas, increases the amou t of titaniferous material retained and the residence time in the reaction zone, and increases the contact effect of the titaniferous material with chlorine by preventing the sintering of the titaniferous materials. The suspension of the carbonaceous substance serves for increasing the reaction efficiency in the process of the present invention together with the use of fine titaniferous materials having a large surface area.

An example of the reactor used in the process of the present invention is illustrated in the accompanying drawing. In the accompanying drawing, stages 1, 2, 3 and 4 of the reactor form an upwardly widening column being connected with one another, and almost the whole zone becomes a solid suspension zone. A chlorine-containing gas is introduced through a feed-pipe 5, flows through stage 1 to 4 of the reactor as an upward flow by way of a throat 6, and enters a cyclone 8 through a conduit 7. The gas separated from solid particles is introduced to a system for the condensation and purification of titanium tetrachloride (not shown) through a conduit 10 by way of a cyclone 9. Solid raw materials consisting of a titaniferous material and a solid carbonaceous substance are introduced into the reactor from a feed bin 11 through a lower feed-pipe 13, but part or all thereof may be introduced from a feed bin 12 through an upper feed-pipe 14. The unreacted carryover particles collected in the cyclone are recycled into the reactor from a recycle pot 15 through a feed-pipe 16. 17 and 18 are nozzles uses for preheating of the reactor at the start of the operation. 19 and 20 are feed-pipes for dry air, nitrogen gas, oxygen gas or a chlorine-containing gas as a carrier gas for solids or a gas introduced supplementarily for chlorination, if necessary, and 21 is a pot for withdrawing the under flow. In the column, the part of the stage 1 of the reactor above the neighborhood of the feed-pipe 16 and the stages 2, 3 and 4 of the reactor form a solid suspension zone. The sectional area of the upper part of the stage 4 is from 1.2 to 10 times as large as the diameter of the stages 1. The solid suspension zone is of an upwardly widening form so that the gas velocities in the stages 1, 2, 3 and 4 decrease in this order even if a change in the volume of the gas due to the reaction or the introduction of the supplemental gas occurs. The reflux of the solid carbonaceous substance occurs in the stage 4, between the stages 4 and 3, between the stages 3 and 2 and between the stages 2 and 1. Thus, the solid suspension zone is in the form of dilute-phase fluidization accompanied by reflux.

EXAMPLE 1

A quartz six-stage upwardly widening column type reactor similar to the reactor as shown in the accompanying drawing, the six stages of which are cylindrical and have the following dimensions, was used:

| First stage: | |
|---|---|
| Diameter | 3.0 cm |
| Length | 80 cm |
| Second stage: | |
| Diameter | 3.2 cm |
| Length | 80 cm |
| Third stage: | |
| Diameter | 3.6 cm |
| Length | 80 cm |
| Fourth stage: | |
| Diameter | 4.2 cm |
| Length | 80 cm |
| Fifth stage: | |
| Diameter | 5.0 cm |
| Length | 80 cm |
| Sixth stage: | |
| Diameter | 5.8 cm |
| Length | 50 cm |

The temperature in the tube in each of the first to sixth stages was controlled by heating the outer wall of each stage electrically, and supplemental heating was carried out if necessary. The feed bins shown as 11 and 12 in the accompanying drawing were not provided. The make-up solid raw materials were fed into a pot for recycle shown as 15. The feed-pipes shown as 13 and 14 in the accompanying drawing were not provided.

The titaniferous material used was one obtained by beneficiating ilmenite by acid-leaching ($TiO_2$ 96% by weight, total Fe 0.8% by weight), and 50% by weight of the titaniferous material passed through a 200 mesh Tyler standard sieve (median value 74 $\mu$). The solid carbonaceous substance used was petroleum calcined coke (60 −16 mesh, median value 510 $\mu$), and the chlorine-containing gas was a mixture consisting of 61% by volume of $Cl_2$, 29% by volume of $N_2$ and 10% by volume of $O_2$.

At first, the particles collected in the cyclone 8 was not recycled, and said beneficiated ilmenite, the coke and a very small amount of chlorine-containing gas as a carrier gas were introduced through the feed-pipe 16. The major part of the chlorine-containing gas was preheated to 1150° C and introduced through the feed-pipe 5. At a steady state, 37.8 g/min. of beneficiated ilmenite and 9.5 g/min. of coke were fed, and the gas velocity in the first stage was 2.58 m/sec. The solid charge concentration in the reactor was 40.9 kg/m$^3$ and the coke content of said solids was 90% by weight.

A controller for an external heater was set so that the temperature of the inside of each stage of the reactor might be maintained at 1150° C. The operation was continued for 65 minutes. Thus, all of the first to sixth stages were maintained at a temperature of about 1150° C and a stable fluidized state with little fluctuation in pressure loss was able to be easily maintained. The conversion of chlorine reached 93%.

The cyclone 8 was connected with the recycle pot 15 and the whole unreacted carryover particles were recycled through the feed-pipe 16 together with an amount of the make-up solid raw materials corresponding to the amount consumed by the reaction. The operation was able to be carried out smoothly. The conversion of chlorine was 98%.

For comparison, a similar experiment was carried out by using coke 50% by weight of which passed through a 150 mesh Tyler standard sieve (median value 104 $\mu$). As a result, the temperature in the reaction zone varied according to place and ranged from 860 to 1240° C in spite of control by external heating, and the heat balance was unstable. The solid concentration in the reactor was 1.6 kg/m$^3$, the coke content of said solids was 23% by weight, and the conversion of chlorine was 72.9%.

EXAMPLE 2

A quartz four-stage upwardly widening column type reactor similar to the reactor as shown in the accompanying drawing or one used in Example 1, the four stages of which have the following dimensions, was used:

| First stage: | |
|---|---|
| Diameter | 1.6 cm |
| Length | 150 cm |
| Second stage: | |
| Diameter | 2.2 cm |
| Length | 150 cm |
| Third stage: | |
| Diameter | 2.8 cm |
| Length | 250 cm |
| Fourth stage: | |
| Diameter | 4.0 cm |

| Length | 50 cm |
|---|---|

The first to fourth stages were able to be heated through the outer wall of each stage. Also, the feed-pipe shown as 13 in the accompanying drawing was provided in the neighborhood of the lower end of the second stage, and part of the make-up slag was fed to the recycle pot shown as 15 in the drawing as in Example 1.

The titaniferous material used was titanium slag ($TiO_2$ 94% by weight, total Fe 1.4% by weight) pulverized to such a degree as 50% by weight of the slag might pass through a 400 mesh Tyler standard sieve (median value 38 $\mu$), and the solid carbonaceous substance used was coke 50% by weight of which might be from 60 to 16 mesh (Tyler standard, median value 510 $\mu$). The chlorine-containing gas used consisted of 85% by volume of $Cl_2$ and 15% by volume of $N_2$.

Through the feed-pipe 5 was introduced 6.7 Nl/min. of the chlorine-containing gas, while 3.3 Nl/min. in all of the chlorine-containing gas was introduced through the feed-pipes 19 and 20. Through the feed-pipe 16 were introduced 6.2 g/min. of the slag and all of the recycled unreacted particles, and 9.2 g/min. of the slag and 3 g/min. of the coke (150 g was fed before the start of the reaction) were fed through the feed-pipes 13 and 14, respectively. The gas velocity in the first stage was 3 m/sec. The operation was carried out for 65 minutes while the first to the fourth stages were maintained at 1000° C. It was possible to carry out a stable operation at a solid concentration in the reactor of 55 kg/m³ and a coke content of said solids of 93%. The conversion of chlorine was about 100%.

What is claimed is:

1. An improved process for continuous production of titanium tetrachloride by chlorinating a titaniferous material in a dilute-phase fluidization system, which comprises 1 feed (a) a fine particulate titaniferous material having a particle size of 400 to 150 mesh (Tyler standard) as a mean value, (b) a coarse particulate solid carbonaceous substance having a particle size as a median value of at least three times as large as that of the titaniferous material and (c) a chlorine-containing gas to a reactor, the reactor having (d) a substantially vertical and long solid suspension zone of a ratio of height to lower part diameter of at least 10 in which (e) a ratio of upper part sectional area to lower part sectional area is from 1.2 to 10 so that the velocity of the upwardly flowing gas does not increase as the gas ascends. (2) controlling the amounts of said reactants fed so that, in the solid suspension zone, (f) the maximum value of the superficial linear velocity of the gas is from 1 to 10 m/sec., (g) the solid concentration is from 10 to 200 kg/m³, and (h) a ratio of the solid carbonaceous substance in solids is from 70 to 99% by weight, (3) repeating pneumatic transport and reflux of most of the solid carbonaceous substance in the upward flow of the gas to form a dilute-phase suspension in which the titaniferous material is chlorinated at a temperature of 900° to 1400° C while is ascends being entrained by the gas flow, and 4 removing the reaction product gas from the upper part of the reactor and separating the reaction product gas into a chloride gas containing titanium tetrachloride and the unreacted solid substances.

2. A process according to claim 1, wherein said titaniferous material is titanium slag and the reaction temperature is from 900° to 1200° C.

3. A process according to claim 1, wherein said titaniferous material is a titanium concentrate obtained by acid leaching of a titaniferous ore, and the reaction temperature is from 1000° to 1300° C.

4. A process according to claim 1, wherein said solid carbonaceous substance has a particle size of 60 to 14 mesh (Tyler standard) as a median value.

5. A process according to claim 1, wherein said solid carbonaceous substance is coke.

6. A process according to claim 1, wherein the maximum value of the superficial linear velocity of the gas in the solid suspension zone is from 1 to 5 m/sec.

7. A process according to claim 1, wherein the solid concentration in the solid suspension zone is from 20 to 100 kg/m³.

8. A process according to claim 1, wherein a ratio of the solid carbonaceous substance in the solids in the solid suspension zone is from 80 to 95% by weight.

9. A process according to claim 1, wherein the unreacted solid raw materials separated from the reaction product gas is recycled to the reactor.

10. A process according to claim 9, wherein the unreacted solid raw materials separated from the reaction product gas is introduced into the reaction zone in the neighborhood of its lower end and the make-up solids are introduced into the solid suspension zone in the neighborhood of is upper end.

11. A process according to claim 1, wherein the reactants are fed into the solid suspension zone at least two places.

12. A process according to claim 1, wherein the make-up solid carbonaceous substance is introduced into the solid suspension zone in the neighborhood of its upper end.

* * * * *